(12) United States Patent
Shepelev

(10) Patent No.: US 9,817,535 B2
(45) Date of Patent: Nov. 14, 2017

(54) MITIGATING SPATIALLY CORRELATED NOISE IN DATA FROM CAPACITIVE SENSORS

(71) Applicant: SYNAPTICS INCORPORATED, San Jose, CA (US)

(72) Inventor: Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 13 days.

(21) Appl. No.: 15/062,865

(22) Filed: Mar. 7, 2016

(65) Prior Publication Data
US 2017/0255294 A1    Sep. 7, 2017

(51) Int. Cl.
G06F 3/045    (2006.01)
G06F 3/044    (2006.01)
G06F 3/041    (2006.01)

(52) U.S. Cl.
CPC ............ G06F 3/044 (2013.01); G06F 3/0418 (2013.01)

(58) Field of Classification Search
CPC ...... G06F 3/0418; G06F 3/044; G06F 3/0412; H03K 17/9622; H03K 2217/960705
See application file for complete search history.

(56) References Cited

U.S. PATENT DOCUMENTS

| | | | |
|---|---|---|---|
| 5,987,156 A | 11/1999 | Ackland et al. | |
| 6,177,918 B1 | 1/2001 | Colgan et al. | |
| 6,215,477 B1 | 4/2001 | Morrison et al. | |
| 6,310,611 B1 | 10/2001 | Caldwell | |
| 7,315,300 B2 | 1/2008 | Hill et al. | |
| 8,121,806 B2 | 2/2012 | Mahowald et al. | |
| 8,269,511 B2 | 9/2012 | Jordan | |
| 8,400,422 B2 | 3/2013 | Chang et al. | |
| 8,411,066 B2 | 4/2013 | Cordeiro et al. | |
| 8,456,443 B2 | 6/2013 | Bulea et al. | |
| 8,471,570 B2 | 6/2013 | Portmann | |
| 8,508,503 B2 | 8/2013 | Lin et al. | |
| 8,536,880 B2 | 9/2013 | Philipp | |
| 8,648,835 B2 | 2/2014 | Rapakko | |
| 8,723,833 B2 | 5/2014 | Curtis et al. | |
| 8,736,573 B2 | 5/2014 | Byun et al. | |
| 8,902,192 B2 | 12/2014 | Miyamoto et al. | |

(Continued)

FOREIGN PATENT DOCUMENTS

JP    2009535742 A    10/2009

*Primary Examiner* — Insa Sadio
(74) *Attorney, Agent, or Firm* — Patterson + Sheridan, LLP

(57) ABSTRACT

This disclosure generally provides an input device with a matrix sensor that includes a plurality of sensor electrodes arranged on a common surface or plane. Moreover, the input device includes routing traces that electrically couple the sensor electrodes to analog front ends (AFEs). Because of the spatial relationships between these electrical components, the sensor electrodes can be categorized into groups where each of the sensors in the group is affected by a common noise source. The capacitive measurements for the sensor electrodes in each of the groups are compared to a touch threshold to determine if an input object (e.g., finger or stylus) is proximate to the sensor electrodes. If the capacitive measurements are below the touch threshold, the input device calculates an offset value that compensates for the noise. After the offset is applied, the compensated capacitive measurements are used to generate a capacitive image.

20 Claims, 5 Drawing Sheets

(56) References Cited

U.S. PATENT DOCUMENTS

| | | |
|---|---|---|
| 8,947,373 B2 | 2/2015 | Kremin et al. |
| 9,081,435 B2 | 7/2015 | Kim et al. |
| 9,098,139 B2 | 8/2015 | Jordan |
| 2002/0089491 A1 | 7/2002 | Willig |
| 2006/0007171 A1 | 1/2006 | Burdi et al. |
| 2008/0158169 A1* | 7/2008 | O'Connor ............ G06F 3/0418 345/173 |
| 2009/0174675 A1 | 7/2009 | Gillespie et al. |
| 2010/0079401 A1 | 4/2010 | Staton |
| 2010/0079402 A1 | 4/2010 | Grunthaner et al. |
| 2011/0242045 A1 | 10/2011 | Park et al. |
| 2011/0242050 A1 | 10/2011 | Byun et al. |
| 2012/0133599 A1 | 5/2012 | Cho et al. |
| 2012/0139846 A1 | 6/2012 | Krah et al. |
| 2012/0182252 A1 | 7/2012 | Brosnan et al. |
| 2012/0200524 A1 | 8/2012 | Vallis et al. |
| 2012/0206407 A1 | 8/2012 | Taylor et al. |
| 2012/0249476 A1* | 10/2012 | Schwartz ............... G06F 3/044 345/174 |
| 2012/0262384 A1 | 10/2012 | Kim et al. |
| 2012/0306803 A1 | 12/2012 | Kuo |
| 2013/0176233 A1 | 7/2013 | Lin et al. |
| 2013/0265242 A1 | 10/2013 | Richards et al. |
| 2014/0062952 A1 | 3/2014 | Savitsky et al. |
| 2015/0002445 A1 | 1/2015 | Brunet et al. |
| 2015/0029137 A1 | 1/2015 | Cheng et al. |
| 2015/0097802 A1 | 4/2015 | Kim et al. |
| 2015/0103042 A1 | 4/2015 | Lee et al. |
| 2015/0138145 A1 | 5/2015 | Hwang et al. |
| 2015/0145802 A1 | 5/2015 | Yao et al. |
| 2015/0153870 A1 | 6/2015 | Lee et al. |

* cited by examiner

MITIGATING SPATIALLY CORRELATED NOISE IN DATA FROM CAPACITIVE SENSORS

FIELD OF THE INVENTION

This invention generally relates to electronic devices and mitigating noise in these devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein includes an input device that includes a plurality of sensor electrodes in a sensing region of the input device where the plurality of sensor electrodes is categorized into respective groups of sensor electrodes where sensor electrodes in each of the groups are affected by a common noise source. The input device also includes a processing system coupled to the plurality of sensor electrodes configured to determine resulting signals for the sensor electrodes in a first group of the groups of sensor electrodes and compare the resulting signals of the first group to a predefined touch threshold to determine whether an input object is proximate to the sensor electrodes in the first group. The processing system is configured to calculate at least one offset using the resulting signals based on a determination that the input object is not proximate to the sensor electrodes in the first group and compensate for an effect of the common noise source by adjusting the resulting signals using the at least one offset.

Another embodiment described herein is a processing system for performing capacitive sensing that includes an interface configured to couple to a plurality of sensor electrodes in a sensing region of an input device, where the plurality of sensor electrodes are categorized into a plurality of groups of sensor electrodes where sensor electrodes in each of the groups are affected by a common noise source. The processing system also includes at least one sensor module configured to determine resulting signals for the sensor electrodes in a first group of the groups of sensor electrodes and compare the resulting signals to a predefined touch threshold to determine whether an input object is proximate to the sensor electrodes in the first group. Moreover, the sensor module is configured to calculate at least one offset using the resulting signals based on a determination that the input object is not proximate to the sensor electrodes in the first group and compensate for an effect of the common noise source by adjusting the resulting signals using the at least one offset.

Another embodiment described herein is a method for performing capacitive sensing using a plurality of sensor electrodes in a sensing region of an input device. The method includes determining resulting signals for sensor electrodes in a first group of the plurality of sensor electrodes where the sensor electrodes in the first group are affected by a common noise source. The method includes comparing the resulting signals of the first group to a predefined touch threshold to determine whether an input object is proximate to the sensor electrodes in the first group and calculating at least one offset using the resulting signals based on a determination that the input object is not proximate to the sensor electrodes in the first group. The method also includes compensating for an effect of the common noise source by adjusting the resulting signals using the at least one offset.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
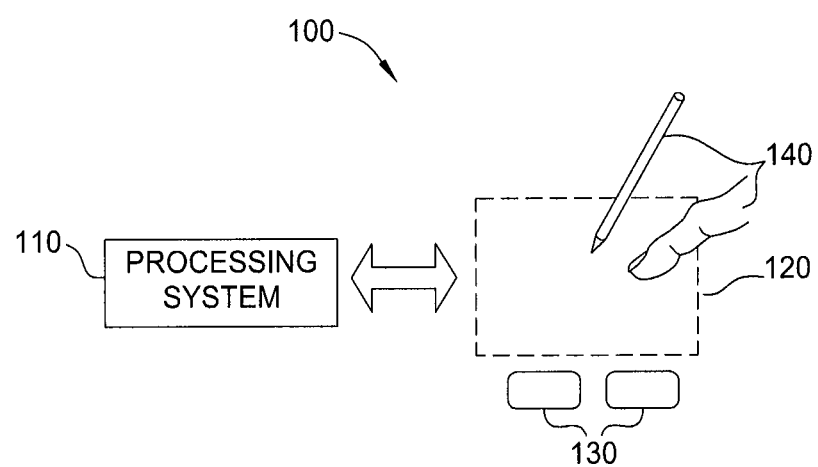
FIG. 1 is a block diagram of an exemplary system that includes an input device in accordance with an embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide input devices and methods that facilitate improved usability. In one embodiment, the input device includes a matrix sensor with a plurality of sensor electrodes arranged on a common surface or plane. Moreover, the input device includes routing traces that electrically couple the sensor electrodes to one or more integrated circuits in a processing system. In turn, the integrated circuits include internal traces that couple the sensor electrodes to analog front ends (AFEs) for determining capacitive sensing measurements corresponding to the sensor electrodes.

Because of the spatial relationships between the routing traces, the internal traces in the integrated circuits, and/or the AFEs, the sensor electrodes can be categorized into groups where each of the sensors in the group are affected by a common noise source. In one example, the routing traces for a column of sensor electrodes in the matrix may be cross coupled (e.g., capacitively coupled). If noise is introduced onto one of the routing traces in the column, this noise is transferred to all the traces because of the capacitive coupling. In another example, the sensor electrodes in the same row (or half of a row) may be selectively coupled to the same AFE. For example, the input device may use a multiplexer to selectively couple each of the sensor electrodes to the same AFE during different time periods. If a circuit in or near the AFE introduces noise when measuring the capacitive sensing measurements, this noise is introduced into each of the sensor electrodes coupled to the AFE, albeit at different times. By understanding the topology and the noise sources of the input device, the sensor electrodes can be logically divided (i.e., categorized) into groups—e.g., a column, row, or half row—where each sensor electrode in a particular group is affected by a common noise source.

In one embodiment, the capacitive sensing measurements for the sensor electrodes in each of the groups are compared to a touch threshold to determine if an input object (e.g., finger or stylus) is proximate to the sensor electrodes. Typically, the capacitive measurements caused by a finger or stylus are much larger than measurements caused by noise sources in a display panel or integrated circuit. Thus, the touch threshold can be set at a level that ensures measurements exceeding the threshold are caused by an input device while measurements below the threshold are caused by noise, and not by the input object. Assuming the capacitive measurements for a group of sensor electrodes are below the touch threshold (i.e., the sensor electrodes are not proximate to an input object), the input device calculates an offset value that compensates for the noise. For example, the input device may average the measurements and then subtract this average (i.e., the offset) from the capacitive measurements of the sensor electrodes in the group in order to remove the noise from the capacitive measurements. The compensated capacitive measurements can then be used to generate a capacitive image for further processing.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects 140 cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object 140. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object 140 near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system 110 for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
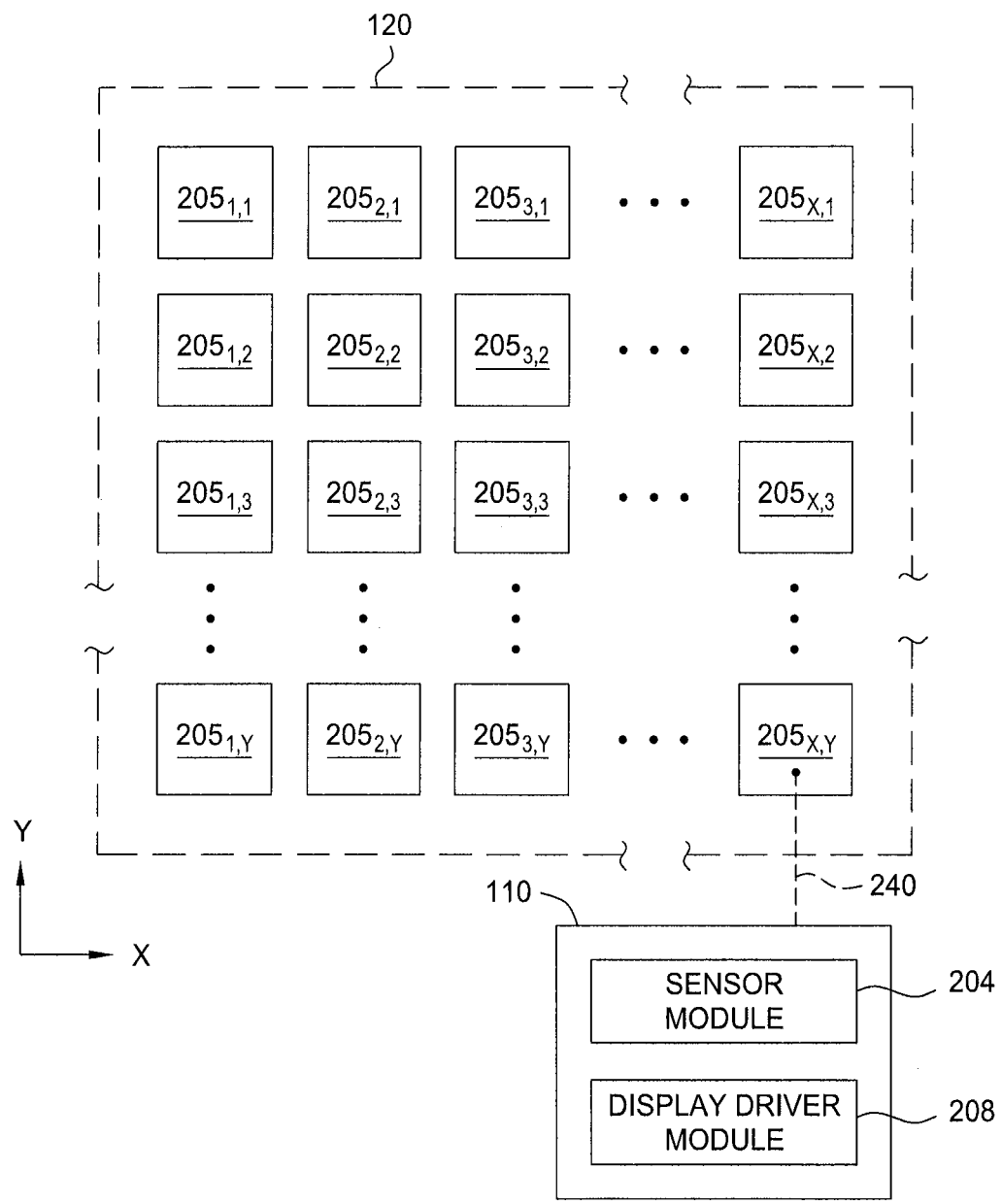
FIG. 2 is input device that includes a matrix sensor arrangement in accordance with an embodiment of the invention.

FIG. 2 shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensing elements described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device.

The exemplary pattern comprises an array of capacitive sensing pixels 205X,Y (referred collectively as pixels 205) arranged in X columns and Y rows in a common plane, wherein X and Y are positive integers, although one of X and Y may be zero. It is contemplated that the pattern of sensing pixels 205 may comprises a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, non-concave concave, etc. As shown here, the sensing pixels 205 are coupled to the processing system 110 and utilized to determine the presence (or lack thereof) of an input object in the sensing region 120.

In a first mode of operation, at least one sensor electrode within the capacitive sensing pixels 205 may be utilized to detect the presence of an input object via absolute sensing techniques. A sensor module 204 in processing system 110 is configured to drive a sensor electrode using a trace 240 in each pixel 205 with a modulated signal (i.e., a capacitive sensing signal) and measure a capacitance between the sensor electrode and the input object (e.g., free space or earth ground) based on the modulated signal, which is utilized by the processing system 110 or other processor to determine the position of the input object.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in the pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with a modulated signal and measuring the absolute capacitance of one or more of the sensor electrodes. In another embodiment, the sensor electrodes may be operated such that the modulated signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may configured to selectively drive and receive with a portion of sensor electrodes. For example, the sensor electrodes may be selected based on, but not limited to, an application running on the host processor, a status of the input device, an operating mode of the sensing device and a determined location of an input device.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 205 include one or more display electrodes used in updating the display of the display screen. In one or more embodiment, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

Continuing to refer to FIG. 2, the processing system 110 coupled to the sensing electrodes includes a sensor module 204 and optionally, a display driver module 208. In one embodiment the sensor module comprises circuitry configured to drive a transmitter signal or a modulated signal onto and receive resulting signals with the resulting signals the sensing electrodes during periods in which input sensing is desired. In one embodiment the sensor module 204 includes a transmitter module including circuitry configured to drive a transmitter signal onto the sensing electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 204 may be selectively coupled to one or more of the sensor electrodes in the capacitive pixels 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In various embodiments the sensor module 204 may comprise a receiver module that includes circuitry configured to receive a resulting signal with the sensing electrodes comprising effects corresponding to the transmitter signal during periods in which input sensing is desired. In one or more embodiments, the receiver module is configured to drive a modulated signal onto a first sensor electrode in one of the pixels 205 and receive a resulting signal corresponding to the modulated signal to determine changes in absolute capacitance of the sensor electrode. The receiver module may determine a position of the input object in the sensing region 120 or may provide a signal including information indicative of the resulting signal to another module or processor, for example, a determination module or a processor of the electronic device (i.e., a host processor), for determining the position of the input object in the sensing region 120. In one or more embodiments, the receiver module comprises a plurality of receivers, where each receiver may be an analog front ends (AFEs).

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver module 208 includes circuitry confirmed to provide display image update information to the display of the display device during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver module 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

Figure 3:
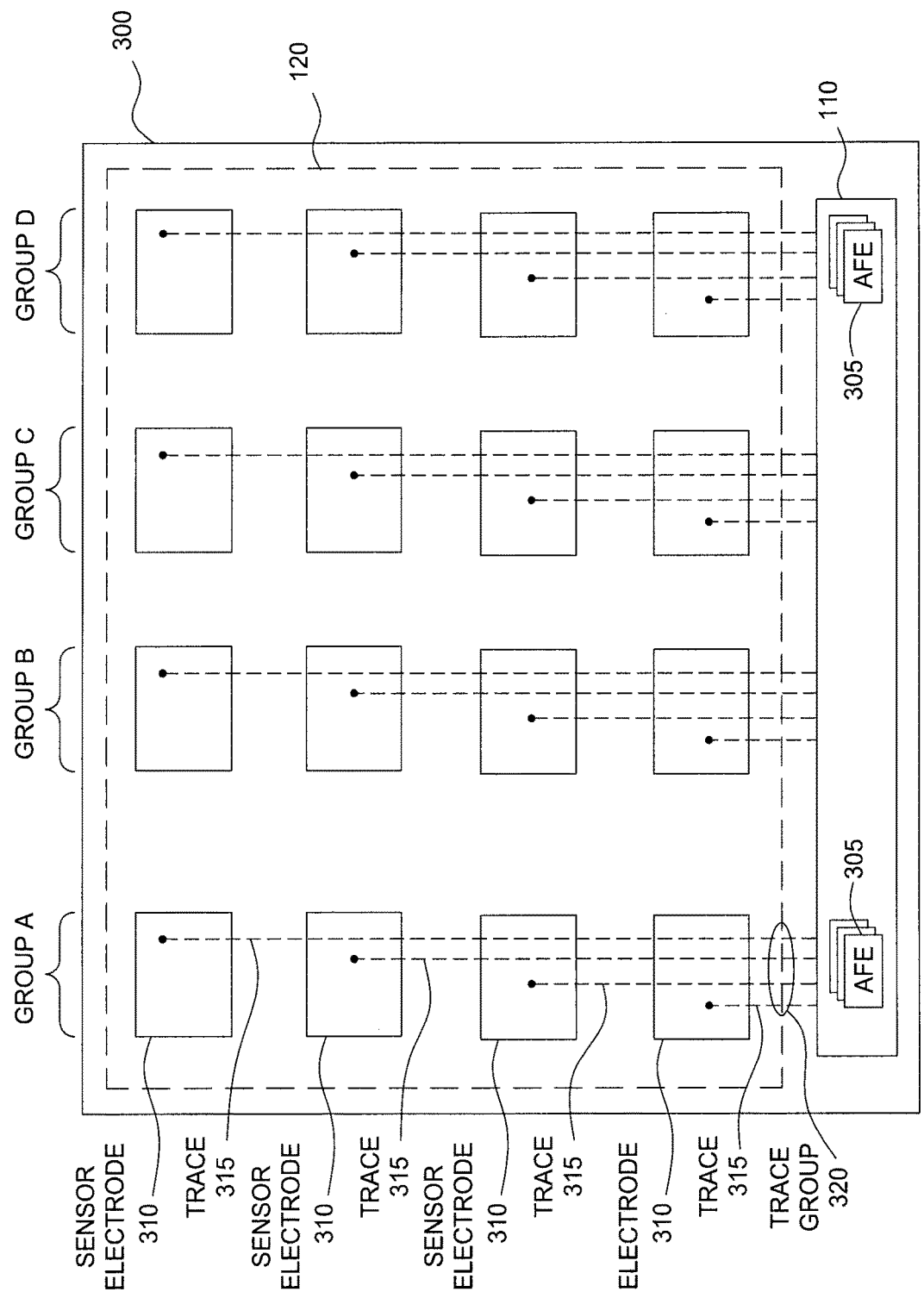
FIG. 3 is a schematic illustrating the connection between the processing system and matrix sensor electrodes, according to one embodiment described herein.

FIG. 3 is a schematic of an input device 300 illustrating the connection between processing system 110 and sensor electrodes 310 using traces 315, according to one embodiment described herein. The input device 300 includes an electrode matrix array that establishes the capacitive sensing region 120. In one embodiment, the sensor electrodes used to establish the sensing region 120 are integrated into a display. However, for simplicity, the source lines (and other display components) are not shown in FIG. 3.

The sensor electrodes 310 are each coupled to the processing system 110 (which may include one or more integrated circuited) using one of the traces 315. The processing system 110 includes one or more interfaces coupled to the traces 315 which permit the processing system 110 to receive signals from, and transmit signals to, the sensor electrodes 310. In this embodiment, each of the traces 315 is coupled to exactly one of the sensor electrodes 310. Moreover, the traces 315 are illustrated as dotted lines to represent that the traces 315 are routed on a plane different from a plane on which the sensor electrodes 310 are disposed. For example, the traces 315 may be disposed on a different substrate (or on a different side of the same substrate) as the sensor electrodes 310. Although not shown, the input device 300 includes respective vias that electrically connect the sensor electrodes 310 on a first plane to one of the traces 315 in a second plane. Moreover, the processing system 110 includes internals traces in an integrated circuit that couple the traces 315 to an AFE 305. Stated differently, the processing system uses both internal traces as well as the external traces 315 to couple the sensor electrodes 310 to one of the AFEs 305.

The AFEs 305 can be any circuitry configured to receive capacitive sensing signals and generate a capacitive sensing measurement. In one embodiment, each AFE 305 is a sensing module (e.g., sensor module 204) that measures absolute capacitance (if performing absolute capacitance sensing) or receives resulting signals (if performing transcapacitance sensing) and generates the capacitive sensing measurement. In one example, the AFEs 305 include integrators that measure the change in capacitive sensing signals due to capacitive coupling between the input device 300 and an input object in the sensing region 120. Each AFE 305 may include an analog-to-digital converter (ADC) for converting the analog signal outputted by the integrator into a digital capacitive sensing measurement. While the embodiments here specifically mention using an AFE to generate the capacitive sensing measurements, other hardware could be included, such as transmitters/drivers that drive signals for transcapacitive sensing. The drivers could also be used for absolute capacitance sensing.

Moreover, multiple sensor electrodes 310 can be coupled to the same AFE 305. In one embodiment, all the sensor electrodes 310 in a column are coupled to the same AFE 305 using a multiplexer (MUX). Using four different time periods, the same AFE 305 can derive a capacitive sensing measurement for each of the sensor electrodes 310 in the column using, for example, either absolute capacitive sensing or transcapacitive sensing. In one embodiment, the AFE 305 coupled to the first column of sensor electrodes 310 (e.g., Group A) can determine a capacitive sensing measurement for one of the sensor electrodes 310 at the same time other AFEs 305 determine capacitive sensing measurements for sensor electrodes 310 in other columns (e.g., Groups B-D). The sensor electrodes 310 in a column not currently being sensed can be driven with a shield signal. The shield signals may comprise a substantially constant voltage or modulated voltage. In cases where the shield signal comprises a modulated voltage, the shield signal may be referred to as a guard signal. When performing transcapacitive sensing, a transmitter signal can be driven on three of the electrodes 310 in a column while the AFE 305 is coupled to the remaining sensor electrode 310 to measure resulting signals generated by the transmitter signals. Using a plurality of non-overlapping time periods, the AFE 305 can determine capacitive sensing measurements for each of the sensor electrodes 310 in the group by changing which sensor electrodes 310 is electrically coupled to the AFE 305.

When routing the traces 315 between the sensor electrodes 310 and the processing system 110, the traces 315 are within close proximity to each other as shown by trace group 320. Because of this spatial relationship, the traces 315 are cross coupled (i.e., capacitively coupled) such that noise introduced on one of the traces 315 is transferred to the remaining traces 315 in the group 320. For example, if switching a gate line in the display introduces noise onto the left most trace 315, this noise is also transferred to the other three traces 315 in group 320. As a result, each time the gate line is switched, noise is introduced onto the traces 315 which may be measured by the AFE 305 when performing capacitive sensing. In one embodiment, the noise source is transient or periodic such that the source affects all the capacitive sensing measurements for the sensor electrodes 310 in Group A. For example, a transient signal in a LCD display panel may generate noise in the topmost sensor electrode 310 in Group A each time the processing system 110 captures a capacitive sensing measurement for the sensor electrodes 310 in the group. Because the topmost sensor electrode is capacitively coupled to the other sensor electrodes in Group A as a result of the close proximity of the traces 315 in a routing plane or layer, the noise introduced onto the topmost sensor electrodes 310 affects the capacitive measurements measured when performing capacitive sensing using the other three sensor electrodes 310 in Group A. Thus, by identifying transient noise sources, a system designer can identify groups of sensor electrodes 310 in the sensing region 120 (e.g., Group A, Group B, Group C, etc.) that are affected by the noise source as a result of the spatial arrangement of the components in the device 300. For example, while all the sensor electrodes 310 in Group A are affected by a transient noise source that affects one of the sensor electrodes 310 in the leftmost column, the sensor electrodes 310 in Groups B, C, and D are not.

In another embodiment, each of the traces 315 and sensor electrodes 310 in a column may be coupled to different AFEs 305. As a result, the AFEs 305 can derive capacitive sensing measurement for the electrodes 310 in the column in parallel. Since the electrodes 310 in a column are sensed in parallel and the traces 315 are cross coupled, any noise introduced into one of the traces will be reflected in the capacitive sensing measurements for all the electrodes 310 in the column. As a result, the columns of sensor electrodes 310 can be grouped as shown.

In another embodiment, the sensor electrodes 310 may be grouped according to routing in the processing system 110. For example, an integrated circuit in the processing system 110 may route traces in close proximity such that the traces are cross coupled similar to the traces 315 in group 320. Thus, if one of the traces in the integrated circuit is affected by a transient noise source, this noise is transferred to the remaining cross coupled traces. For example, even if the traces 315 are not cross coupled (i.e., are not capacitively coupled) in the routing layer, the internal routing in the processing system 110 coupling the traces 315 to the AFEs 305 can be cross coupled. Because of this spatial relationship, the sensor electrodes 310 electrically coupled to the internal traces in the processing system can be grouped together. Thus, any periodic noise source (e.g., a circuit in the integrating circuit, an AFE, power supply, display driver, other capacitive sensing circuitry, and the like) affecting one of the internal traces can affect the capacitive measurements taken using all of the sensor electrodes 310 in the group because of the cross coupling between the internal traces. By identifying cross coupled traces in the processing system 110, the sensor electrodes 310 can be categorized in groups in order to compensate for periodic (or transient) noise sources as described in detail below.

In another embodiment, the sensor electrodes 310 are grouped according to capacitive coupling between the electrodes 310 themselves. For example, the spacing between neighboring electrodes (i.e., electrodes that are directly adjacent) may mean that these electrodes are capacitive coupled such that noise introduced onto one of the sensor electrodes 310 is transferred to all its neighboring electrodes 310. If the noise source is periodic and occurs when deriving capacitive sensing measurements for all the neighboring electrodes, the noise can be identified and removed as described below.

FIG. 3 is just one exemplary configuration of the input device 300. In other embodiments, the device 300 may include more or less sensor electrodes 310 in a column or row than the example shown. For example, a column may include eight sensor electrodes 310 arranged in a column in which case the processing system 110 may use two 4:1 muxes to couple four of the eight sensor electrodes 310 to one AFE 305 and the other four sensor electrodes 310 to another AFE 305.

Figure 4:
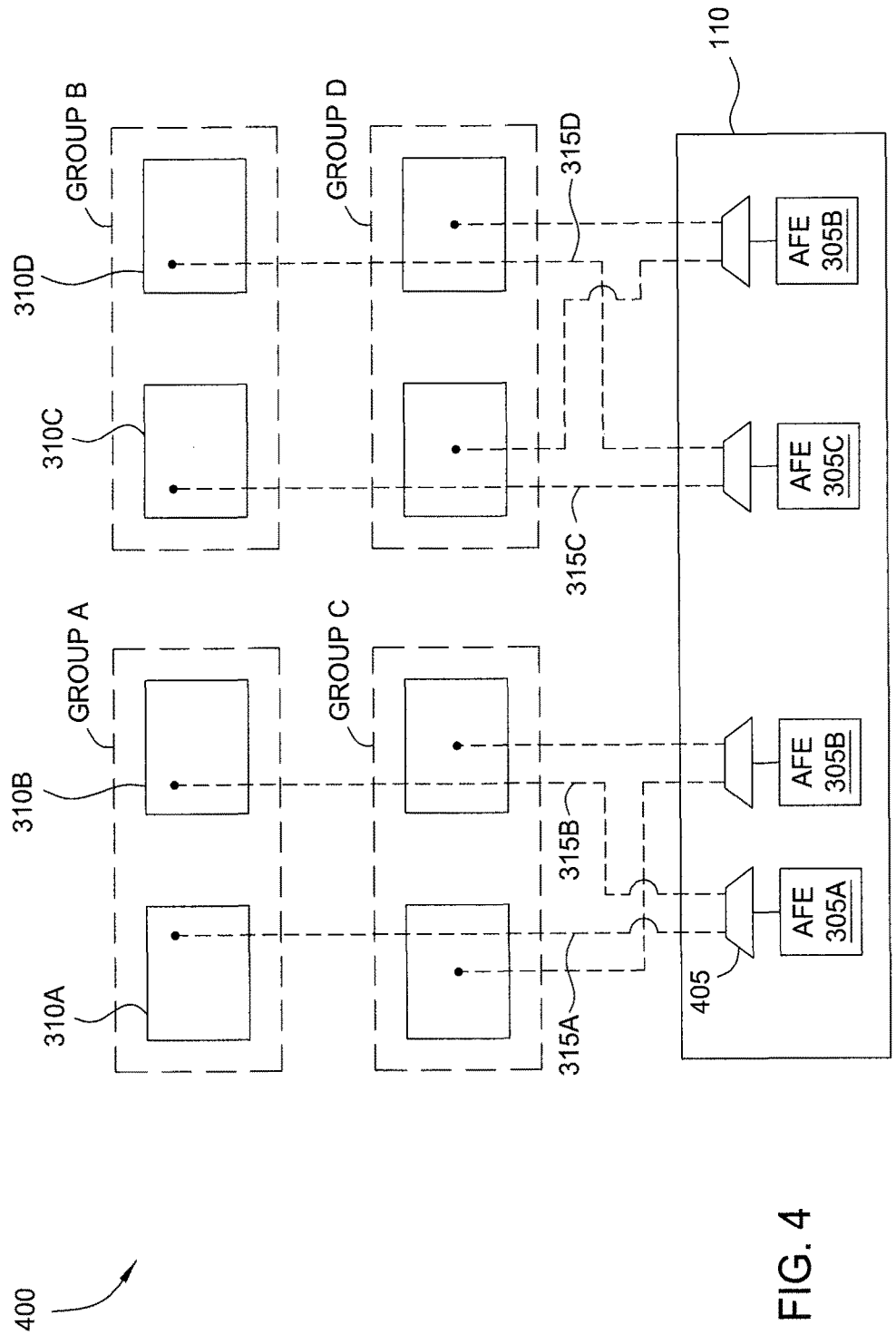
FIG. 4 is a schematic illustrating the connection between analog front ends to matrix sensor electrodes, according to one embodiment described herein.

FIG. 4 is a schematic of an input device 400 illustrating the connection between AFEs 305 to the sensor electrodes 310, according to one embodiment described herein. In device 400, sensor electrodes 310 in a row (rather than in a column) are selectively coupled to the same AFE 305. In this example, the sensor electrodes 310A and 310B (e.g., the left half of the top row) are coupled via traces 315A and 315B to AFE 305A. In contrast, sensor electrodes 310C and 310D (i.e., the right half of the top row) are coupled via traces 315C and 315D to AFE 305C. The bottom row is arranged in a similar manner where the sensor electrodes 310 in the left half are coupled to AFE 305B and the electrodes 310 in the right half are coupled to AFE 305D. Using multiplexers 405, the processing system 110 can control which of the sensor electrodes 310 are currently coupled to the AFEs 305.

In one embodiment, the AFEs 305 coupled to sensor electrodes 310 in the left sides of the rows (i.e., AFEs 305A and 305B) are disposed in a left side of the processing system 110—e.g., on a left side of an integrated circuit—while the AFEs 305 coupled to sensor electrodes 310 in the right sides of the rows (i.e., AFES 305C and 305D) are disposed in a right side of the processing system 110. In one embodiment, AFEs 305A and 305B may be disposed in a different integrated circuit than AFEs 305C and 305D. Furthermore, although traces 315 are shown as routing in a vertical direction, in one example, AFEs 305A and 305B are disposed to the left of the sensor electrodes 310, while AFEs 305C and 305D are disposed to the right of the electrodes 310. Instead of routing vertically, the traces 315 can route horizontally to couple the electrodes 310 to the AFEs 305. For example, the traces 315 coupled to the sensor electrodes 310 in the left sides of the rows route out to the left side of the input device 400 while the traces 315 coupled to the sensor electrodes 310 in the right sides of the row route out to the right side of the input device 400. Like in input device 300, the traces 315 may be routed on a separate layer or plane than the layer containing the sensor electrodes 310.

As shown, the sensor electrodes 310 are categorized into logical groups (e.g., Groups A, B, C, and D) according to which AFE 305 the electrodes 310 are coupled. For example, when performing capacitive sensing, each AFE 305 may introduce noise into the capacitive sensing measurement. Because the amplitude or frequency of the noise may be unique to each AFE 305, the sensor electrodes 310 are grouped according to which AFE 305 the sensor electrodes 310 are connected. For example, each time AFE 305A derives capacitive sensing measurements for electrodes 310A and 310B, a circuit in AFE 305A introduces the same noise into the measurements. Because this noise is periodic, the processing system 110 can compensate for the noise (i.e., remove the noise from the capacitive sensing measurements) as described below.

As shown in FIG. 4, the electrodes 310 can be grouped according to which circuits (e.g., AFEs 305) they are electrically coupled to, in addition to the factors described in FIG. 3 such as cross coupled electrical components in the sensing region and/or in the processing system 110. In this example, the electrodes are grouped into half rows since each of the sensors electrodes 310 in a half of a row are selectively coupled to the same AFE 305. However, if the entire row is selectively coupled to the same AFE 305, then the electrodes 310 may be grouped into full rows. Alternatively, if a third of the sensor electrodes 310 in each row are coupled to the same AFE 305, then each row may be subdivided into three groups.

Generally, FIGS. 3 and 4 illustrate that the sensor electrodes 310 can be categorized into logical groupings by identifying periodic noise sources that affect the capacitance sensing measurements for all the sensor electrodes 310 in that group. However, the periodic noise source does not need to affect the capacitance sensing measurements equally. For example, referring back to FIG. 3, a noise source coupled to the traces 315 in group 320 may affect the capacitive sensing measurement of the sensor electrodes in Group A differently because of the different capacitances associated with the traces 315 in group 320. Put differently, because the traces 315 in group 320 have different lengths, each trace 315 has a corresponding capacitance and/or resistance value which changes how the noise affects the capacitance sensing measurement for the corresponding sensor electrode 310. As a result, the noise source may have a different effect on the capacitance sensing measurement for the topmost sensor electrode 310 than the bottommost sensor electrode 310 in Group A because of the different lengths of the respective traces 315. In contrast, in other arrangements, the noise source may have substantially the same effect on the capacitive sensing measurements for the sensor electrodes 310 in a group. For example, in FIG. 4, the electrical characteristics of the electrical connections between the AFE 305A and the sensor electrodes 310A and 310B may be substantially the same. Thus, if the AFE 305A (or a circuit close by in the processing system 110) is a noise source, the resulting noise affects the capacitive sensing measurements for electrodes 310A and 310B in substantially the same manner.

Figure 5:
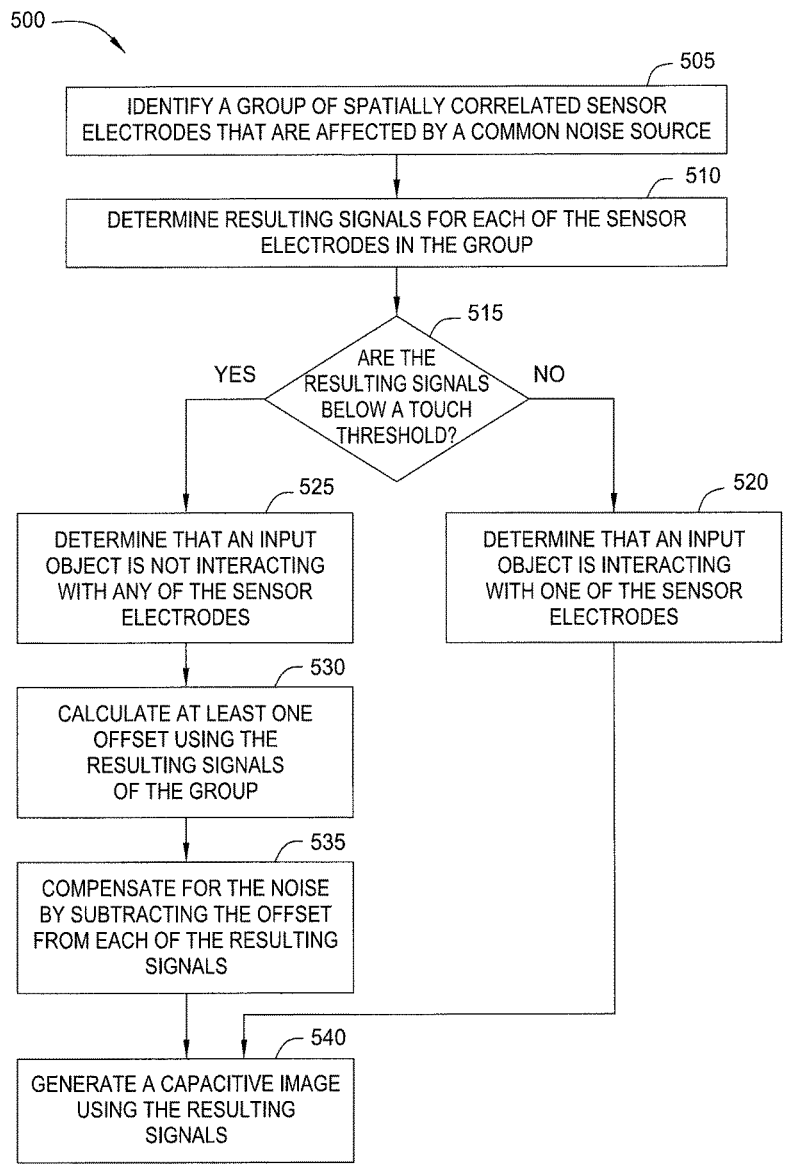
FIG. 5 is a flowchart for compensating for noise introduced into a group of sensor electrodes, according to one embodiment described herein.

FIG. 5 is a flowchart of a method 500 for compensating for noise introduced into a group of sensor electrodes, according to one embodiment described herein. At block 505, the processing system identifies a group of spatially correlated sensor electrodes that are affected by a common noise source. The sensor electrodes may grouped using any of the techniques described above such as cross coupled traces in a display panel, cross coupled routes internal to an integrated circuit, cross coupled sensor electrodes, couplings to the same circuit (e.g., AFE), and the like. In one embodiment, the groupings of the sensor electrodes may be provided by a system designer. For example, by testing the input device, the system designer may identify a periodic noise source such as a transient signal in a LCD panel or a driver circuit in the processing system which injects noise into the capacitive sensing measurements. Using the topology of the input device, the system designer can identify which sensor electrodes are directly or indirectly coupled (e.g., via capacitive coupling) to the noise source. The system designer can inform the processing system of the noise source and the group of sensor electrodes affected by the source.

At block 510, the processing system determines resulting signals for the sensor electrodes in the group. For example, using absolute or transcapacitive sensing, one or more AFEs in the processing system generate capacitive sensing measurements which are used as the resulting signals. In one embodiment, the resulting signals are digital values that represent a change in capacitance relative to a baseline measurement. In one example, Resulting signals indicate a change from the baseline measurement captured when no input object is interacting with the input device. Moreover, the resulting signals can be affected by the noise source. In another embodiment, the resulting signals are processed to determine an amount of interference caused by noise in the input device and may not be used to track input objects.

At block 515, the processing system compares the resulting signals (e.g., capacitive sensing signals) to a touch threshold to determine if an input object (e.g., finger or stylus) is proximate to the sensor electrodes. Typically, the capacitive measurements caused by a finger are much larger than measurements affected only by noise sources in a display panel or an integrated circuit. Thus, in one embodiment, the touch threshold is set at a value that ensures resulting signals exceeding the threshold are caused by an input device while signals below the threshold are caused by noise and not by any input object.

If any one of the resulting signals for the group of sensor electrodes are above the threshold, method 500 proceeds to block 520 where the processing system determines that an input object is interacting with one of the sensor electrodes in the group. For example, referring to FIG. 3, the resulting signals for the topmost electrode in Group A may satisfy the touch threshold while the measurements for the other electrodes in Group A do not. Because at least one of the electrodes exceeds the threshold, the processing system skips the noise compensation process described below. That is, method 500 proceeds to block 540 where processing system uses the resulting signals for the group of electrodes to generate a capacitive image without compensating for the noise that may have been introduced by the common noise source. However, the noise compensation technique described below can also be used to alter the resulting signals measured on sensor electrodes that are above the touch threshold.

If the resulting signals are below the threshold, method 500 proceeds from block 515 to block 525 where the processing system determines that an input object is not interacting with any of the sensor electrodes in the group. Stated differently, at block 525, the processing system determines that an input object is not proximate to the sensor electrodes in the group since the resulting signals do not exceed the predetermined touch threshold.

At block 530, the processing system calculates at least one offset using the resulting signals of the group of sensor electrodes. Because the processing system has determined that an input object is not interacting with the sensor electrodes, then much of the difference between the baseline measurement and the resulting signals is attributable to the periodic noise source. That is, but for the noise source, the resulting signals should be close to zero, indicating no or very little change from the baseline measurement. However, the input object may still be the cause of some change in the resulting signals from the baseline measurement. Thus, in one embodiment, the offset indicates how much of the change from the baseline measurement is attributable to the noise source.

In one embodiment, the processing system averages resulting signals for the sensor electrodes in the group to determine the offset. For example, if the noise source affects the resulting signals equally, then averaging the resulting signals identifies the offset which estimates the amount of noise introduced into the resulting signals. Averaging the offset may be used in the arrangement shown in FIG. 4 where noise introduced by the AFE 305 coupled to the electrodes 310 in the same group has substantially the same effect on the resulting signals. Generally, taking the average of the resulting signals estimates the amount of power injecting into the AFE from the noise source over time.

Other techniques for measuring the offset may be used if the noise source does not affect the resulting signals equally. For example, noise introduced on the traces 315 shown in FIG. 3 (which have varying lengths) may have varying effects on the resulting signals for the sensor electrodes in the column. That is, even if the resulting signals were captured simultaneously, the noise source may inject more power into one of the resulting signals than another. As a result, the processing system may use a linear or non-linear function to calculate a customized offset for each of the sensor electrodes in the group. The function may model how the noise source affects the resulting signals depending on the particular electrical properties of the electrical connections between the sensor electrodes and the AFE (or AFEs) in the group. Thus, instead of having one offset, the processing system calculates multiples offsets depending on the particular capacitance or resistance corresponding to the sensor electrodes.

In one embodiment, the offset may be used to alter the resulting signals for sensor electrodes outside of the group. For example, the common noise source may affect a plurality of sensor electrodes, but the group of electrodes used to generate the offset may only be a subset of the plurality of sensor electrodes. Nonetheless, the input device can use the offset to adjust the resulting signals for all the sensor electrodes affected by the same noise source.

Moreover, in one embodiment, the offset is applied to the resulting signals that satisfy (e.g., are above) the touch threshold used at block 515. That is, the sensor electrode may also be affected by the same noise source as the group of electrodes used to generate the offset. Thus, the input device can use the offset to adjust the resulting signals for electrodes outside the group that may currently be proximate to the input object.

At block 535, the processing system compensates for the noise by subtracting the offset from the resulting signals of each of the sensor electrodes. If the offset is the same for all the electrodes in the group, the processing system subtracts the same offset from all the resulting signals. If, however, the offset is different for different sensor electrodes, the processing system subtracts the customized offsets from the corresponding resulting signals. After compensating for the effects of the noise source, the remaining value of the resulting signals represents the effect of the input object at the locations corresponding to the sensor electrodes in the group.

Method 500 then proceeds to block 540 where the processing system uses the compensated (and uncompensated if any) resulting signals to generate the capacitive image. Removing or mitigating the noise at the locations of the sensor electrodes that are not interacting with the input object provide a cleaner capacitive image relative to using solely uncompensated measurements. For example, rather than only looking for locations where the input object is proximate to the sensor electrodes, some capacitive sensing algorithms evaluate the amount of force applied by the input object or identify spacing between multiple input objects interacting with the sensing region. These algorithms may process the capacitive image to identify locations which sensor electrodes are not proximate to the input object. Put differently, it may be important to these algorithms to determine where the input object is, and where the input object is not, in the sensing region. Moreover, the algorithms may process the capacitive images to determine peaks and valleys of the resulting signals.

Using method 500, the resulting capacitive images provide more accurate resulting signals for the locations in the sensing region that are not proximate to the input object as well as locations in the sensing region that are proximate to the input object. For example, if the group of electrodes is between two locations in the sensing region that are being simultaneously contacted by two fingers, removing the noise from the resulting signals derived from the group of electrodes provides a more accurate indicator that the input device is being contacted by at two different points rather than being contacted by one large input object (e.g., the palm of the hand). Similarly, if the processing system (or other hardware or software application) uses the difference between capacitive measurements in the image to determine the amount of force used to press the input object against the input device, this force measurement may be improved by using method 500 to remove the noise from the resulting signals where the input object is not touching, thereby providing a more accurate contrast between the resulting signals captured at the locations where the input object is touching and the resulting signals captured at the locations where the input object is not touching.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

I claim:

1. An input device, comprising:
   a plurality of sensor electrodes in a sensing region of the input device, wherein the plurality of sensor electrodes is categorized into respective groups of sensor electrodes where sensor electrodes in each of the groups of sensor electrodes are affected by a common noise source; and
   a processing system coupled to the plurality of sensor electrodes, the processing system is configured to:
      determine resulting signals for the sensor electrodes in a first group of the groups of sensor electrodes,
      compare the resulting signals of the first group to a predefined touch threshold to determine whether an input object is proximate to the sensor electrodes in the first group,
      calculate at least one offset using the resulting signals based on a determination that the input object is not proximate to the sensor electrodes in the first group, and
      compensate for an effect of the common noise source by adjusting the resulting signals using the at least one offset.

2. The input device of claim 1, wherein the plurality of sensor electrodes are disposed in a matrix array in a common plane.

3. The input device of claim 2, wherein the sensor electrodes in the first group are arranged along a same column in the matrix array.

4. The input device of claim 2, wherein each of the sensor electrodes in the first group comprise at least one display electrode of a display device used during display updating and when determining at least one of the resulting signals.

5. The input device of claim 2, further comprising:
   routing traces disposed on a routing plane different from the common plane, wherein each of the routing traces couples only one of the plurality of sensor electrodes to the processing system, and wherein a portion of the routing traces corresponding to the sensor electrodes in the first group are capacitively coupled in the routing plane such that noise introduced by the common noise source is transferred between the portion of routing traces.

6. The input device of claim 1, wherein the resulting signals for the sensor electrodes in the first group are determined in parallel by the processing system.

7. The input device of claim 1, wherein the resulting signals for the sensor electrodes in the first group are determined sequentially during non-overlapping time periods.

8. The input device of claim 7, further comprising:
   an analog front end (AFE) disposed in the processing system, wherein the AFE is selectively coupled to each of the sensor electrodes in the first group, wherein the AFE determines the resulting signals during the non-overlapping time periods.

9. A processing system for performing capacitive sensing, comprising:
   an interface configured to couple to a plurality of sensor electrodes in a sensing region of an input device, wherein the plurality of sensor electrodes are categorized into a plurality of groups of sensor electrodes where sensor electrodes in each of the plurality of groups of sensor electrodes are affected by a common noise source; and at least one sensor module configured to:
- determine resulting signals for the sensor electrodes in a first group of the plurality of groups of sensor electrodes,
- compare the resulting signals to a predefined touch threshold to determine whether an input object is proximate to the sensor electrodes in the first group,
- calculate at least one offset using the resulting signals based on a determination that the input object is not proximate to the sensor electrodes in the first group, and
- compensate for an effect of the common noise source by adjusting the resulting signals using the at least one offset.

10. The processing system of claim 9, wherein the interface is configured to couple to routing traces disposed on a routing plane different from a common plane, wherein each of the routing traces couples only one of the plurality of sensor electrodes to the processing system, and wherein a portion of the routing traces corresponding to the sensor electrodes in the first group are capacitively coupled in the routing plane such that noise introduced by the common noise source is transferred between the portion of routing traces.

11. The processing system of claim 9, wherein the resulting signals for the sensor electrodes in the first group are determined in parallel by the processing system.

12. The processing system of claim 9, wherein the resulting signals for the sensor electrodes in the first group are determined sequentially during non-overlapping time periods.

13. The processing system of claim 12, further comprising:
an AFE disposed in the processing system, wherein the AFE is selectively coupled to each of the sensor electrodes in the first group, wherein the AFE determines the resulting signals during the non-overlapping time periods.

14. A method for performing capacitive sensing using a plurality of sensor electrodes in a sensing region of an input device, comprising:
determining resulting signals for sensor electrodes in a first group of the plurality of sensor electrodes where the sensor electrodes in the first group are affected by a common noise source;

comparing the resulting signals of the first group to a predefined touch threshold to determine whether an input object is proximate to the sensor electrodes in the first group;

calculating at least one offset using the resulting signals based on a determination that the input object is not proximate to the sensor electrodes in the first group; and compensating for an effect of the common noise source by adjusting the resulting signals using the at least one offset.

15. The method of claim 14, further comprising:
driving each of the sensor electrodes in the first group during display updating, wherein each of the sensor electrodes in the first group comprises at least one display electrode of a display device used during display updating and when determining at least one of the resulting signals.

16. The method of claim 14, wherein determining the resulting signals for the sensor electrodes in the first group comprises:
driving capacitive sensing signals on routing traces disposed on a routing plane different from a common plane on which the plurality of sensor electrodes are disposed, and wherein a portion of the routing traces corresponding to the sensor electrodes in the first group are capacitively coupled in the routing plane such that noise introduced by the common noise source is transferred between the portion of routing traces.

17. The method of claim 14, wherein determining the resulting signals for the sensor electrodes in the first group comprises:
measuring the resulting signals for the sensor electrodes in the first group in parallel.

18. The method of claim 14, wherein determining the resulting signals for the sensor electrodes in the first group comprises:
measuring the resulting signals for the sensor electrodes sequentially during non-overlapping time periods.

19. The method of claim 18, wherein measuring the resulting signals for the sensor electrodes sequentially during non-overlapping time periods comprises:
selectively coupling an AFE to each of the sensor electrodes in the first group, wherein the AFE determines the resulting signals during the non-overlapping time periods.

20. The method of claim 14, wherein the plurality of sensor electrodes are disposed in a matrix array in a common plane.

* * * * *